United States Patent
Sigal et al.

(10) Patent No.: US 9,928,442 B2
(45) Date of Patent: Mar. 27, 2018

(54) JOINT PHOTO STREAM AND BLOG POST SUMMARIZATION AND EXPLORATION

(71) Applicant: Disney Enterprises, Inc., Burbank, CA (US)

(72) Inventors: Leonid Sigal, Pittsburgh, PA (US);
Gunhee Kim, Gwanak-gu (KR);
Seungwhan Moon, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 51 days.

(21) Appl. No.: 15/076,803

(22) Filed: Mar. 22, 2016

(65) Prior Publication Data

US 2017/0277970 A1    Sep. 28, 2017

(51) Int. Cl.
  G06K 9/00    (2006.01)
  G06K 9/52    (2006.01)
  G06K 9/32    (2006.01)
  G06K 9/62    (2006.01)
  G06F 17/30   (2006.01)
  H04L 12/58   (2006.01)

(52) U.S. Cl.
  CPC ......... *G06K 9/52* (2013.01); *G06F 17/30017* (2013.01); *G06K 9/00456* (2013.01); *G06K 9/00463* (2013.01); *G06K 9/00751* (2013.01); *G06K 9/325* (2013.01); *G06K 9/6218* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 8,078,623 B2 * | 12/2011 | Chou | G06F 17/30247 382/159 |
| 8,818,022 B2 * | 8/2014 | Muriello | H04N 21/44008 382/100 |
| 9,185,469 B2 * | 11/2015 | Gallagher | G11B 27/034 |
| 9,405,771 B2 * | 8/2016 | Balakrishnan | G06F 17/30256 |
| 9,483,556 B1 * | 11/2016 | Cohen | G06F 17/3079 |
| 2012/0213404 A1 * | 8/2012 | Steiner | G06F 17/30256 382/103 |

(Continued)

OTHER PUBLICATIONS

A. Aizawa. An information-theoretic perspective of tf-idf measures. Information Processing Management, 39(1):45-65, 2003. [Abstract Only].

(Continued)

*Primary Examiner* — Soo Park
(74) *Attorney, Agent, or Firm* — Patterson + Sheridan, LLP (57) ABSTRACT

Systems, methods, and computer program products to perform an operation comprising assigning each of a plurality of images in a blog post and each of a plurality of images in a collection of images to a respective node in a graph, computing an adjacency matrix for the graph, wherein the adjacency matrix defines relationships between images in the blog post and images in the collections of images, and determining a first subset of the images in the collection of images that summarize the images in the image collection, wherein the subset is determined based on the adjacency matrix, wherein the adjacency matrix is computed based on the subset of the images in the collection of images.

23 Claims, 8 Drawing Sheets

(56) References Cited

U.S. PATENT DOCUMENTS

2013/0243273 A1* 9/2013 Yamaji ............... G06K 9/00228
                                                      382/118

OTHER PUBLICATIONS

P. Das, C. Xu, R. F. Doell, and J. J. Corso. A Thousand Frames in Just a Few Words: Lingual Description of Videos through Latent Topics and Sparse Object Stitching. In CVPR, 2013.

K. El-Arini, G. Veda, D. Shahaf, and C. Guestrin. Turning Down the Noise in the Blogosphere. In KDD, 2009.

S. Fidler, A. Sharma, and R. Urtasun. A Sentence is Worth a Thousand Pixels. In CVPR, 2013.

A. S. Gordon and R. Swanson. Identifying Personal Stories in Millions of Weblog Entries. In ICWSM Data Challenge Workshop, 2009.

S. Guadarrama, N. Krishnamoorthy, G. Malkarnenkar, S. Venugopalan, R. Mooney, T. Darrell, and K. Saenko. YouTube2Text: Recognizing and Describing Arbitrary Activities Using Semantic Hierarchies and Zero-shot Recognition. In ICCV, 2013.

R. Ji, X. Xie, H. Yao, andW.-Y. Ma. Mining City Landmarks from Blogs by Graph Modeling. In ACMMM, 2009.

T. Joachims. Training Linear SVMs in Linear Time. In KDD, 2006.

T. Joachims, T. Finley, and C.-N. J. Yu. Cutting-plane training of structural SVMs. Mach Learn, 77:27-59, 2009.

G. Kim and E. P. Xing. Reconstructing Storyline Graphs for Image Recommendation from Web Community Photos. In CVPR, 2014.

G. Kulkarni, V. Premraj, S. Dhar, S. Li, Y. Choi, A. C. Berg, and T. L. Berg. Baby Talk: Understanding and Generating Image Descriptions. In CVPR, 2011.

A. Kushal, B. Self, Y. Furukawa, D. Gallup, C. Hernandez, B. Curless, and S. M. Seitz. Photo Tours. In 3DIMPVT, 2012.

J. Lafferty, A. McCallum, and F. C. Pereira. Conditional random fields: Probabilistic models for segmenting and labeling sequence data. ICML, 2001.

L. Li, K. Zhou, G.-R. Xue, H. Zha, and Y. Yu. Enhancing Diversity, Coverage and Balance for Summarization through Structure Learning. In WWW, 2009.

D. Liu, X.-S. Hua, M.Wang, and H.-J. Zhang. Image Retagging. In MM, 2010.

B. A. Nardi, D. J. Schiano, M. Gumbrecht, and L. Swartz. Why We Blog. CACM, 47(12):41-46, 2004 [Abstract Only].

V. Ordonez, G. Kulkarni, and T. L. Berg. Im2Text: Describing Images Using 1 Million Captioned Photographs. In NIPS, 2011.

A. Qamra, B. Tseng, and E. Y. Chang. Mining Blog Stories Using Community-based and Temporal Clustering. In CIKM, 2006.

L. A. Ramshaw and M. P. Marcus. Text chunking using transformation-based learning. 3rd ACL Workshop on Very Large Corpora, 1995. [Abstract Only].

M. Rohrbach, W. Qiu, I. Titov, S. Thater, M. Pinkal, and B. Schiele. Translating Video Content to Natural Language Descriptions. In ICCV, 2013.

S. Rose, D. Engel, N. Cramer, and W. Cowley. Automatic keyword extraction from individual documents. In M. W. Berry and J. Kogan, editors, Text Mining. Applications and Theory, pp. 1-20. John Wiley and Sons, Ltd, 2010.

B. C. Russell, R. Martin-Brualla, D. J. Butler, S. M. Seitz, and L. Zettlemoyer. 3D Wikipedia: Using Online Text to Automatically Label and Navigate Reconstructed Geometry. In SIGGRAPH Asia, 2013.

E. F. T. K. Sang and F. D. Meulder. Introduction to the conll- 2003 shared task: language-independent named entity recognition. CONLL, 4, 2003.

S. Shalev-Shwartz, Y. Singer, and N. Srebro. Pegasos: Primal Estimated sub-GrAdient SOlver for SVM. In ICML, 2007.

S. Shalev-Shwartz and A. Tewari. StochasticMethods for L1 Regularized Loss Minimization. In ICML, 2009.

I. Simon, N. Snavely, and S. M. Seitz. Scene Summarization for Online Image Collections. In ICCV, 2007.

N. Snavely, S. M. Seitz, and R. Szeliski. Photo Tourism: Exploring Photo Collections in 3D. In SIGGRAPH, 2006.

C. Sutton and A. McCallum. Piecewise pseudolikelihood for efficient training of conditional random fields. ICML, 2007.

C.-N. J. Yu and T. Joachims. Learning Structural SVMs with Latent Variables. In ICML, 2009.

Y. Yue and T. Joachims. Predicting Diverse Subsets Using Structural SVMs. In ICML, 2008.

C. L. Zitnick, D. Parikh, and L. Vanderwende. Learning the Visual Interpretation of Sentences. In ICCV, 2013.

* cited by examiner

(A) INPUT: LARGE SETS OF BLOG POSTS AND PHOTO STREAMS

FIG. 4A (B) BLOGS TRANSFER SEMANTIC KNOWLEDGE TO PHOTO STREAMS (TITLE, LOCATION)

FIG. 4B (C) PHOTO STREAMS HELP INTERPOLATION BETWEEN BLOG IMAGES

JOINT PHOTO STREAM AND BLOG POST SUMMARIZATION AND EXPLORATION

BACKGROUND

Field of the Invention

Embodiments disclosed herein relate to the field of computer software. More specifically, embodiments disclosed herein provide joint summarization and exploration between images in photo streams and blog posts.

Description of the Related Art

Photo streams include large collections of images captured and uploaded by users to online hosting services. The images stored in a photo stream are often unorganized, unstructured, and lack any descriptive text information. For example, a user may upload hundreds or thousands of photos from a recent vacation to a photo stream. Bloggers may create and publish blog posts that have images and associated text that portray events and/or experiences with concise sentences and representative images. For example, in a travel blog, users may write detailed stories about trips to different destinations, and select images that are representative of their trip from a larger collection of images.

SUMMARY

Embodiments disclosed herein provide systems, methods, and computer program products to perform an operation comprising assigning each of a plurality of images in a blog post and each of a plurality of images in a collection of images to a respective node in a graph, computing an adjacency matrix for the graph, wherein the adjacency matrix defines relationships between images in the blog post and images in the collections of images, and determining a first subset of the images in the collection of images that summarize the images in the image collection, wherein the subset is determined based on the adjacency matrix, wherein the adjacency matrix is computed based on the subset of the images in the collection of images.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein leverage collections of images (referred to herein as "photo streams" or "image streams") and blog posts in a mutually beneficial way through joint summarization and exploration. For example, a blog post may contain carefully selected photos that may represent iconic moments of an event or described topic, such as a family vacation. The blog post may provide strong clues as to what is important for an image collection that is based on the same (or similar) event or topic. Therefore, the blog post may be used to identify a subset of images from the image collection that serve as a summarization of the entire image collection. Similarly, because blog posts generally include fewer, more carefully selected images, the images in the photo stream can be used to provide an interpolation of the blog images. The images identified for the interpolation may then be returned as an example depiction of events that occurred in the time period between two images depicted in the blog post. Further still, embodiments disclosed herein extract descriptive textual information from blog posts that may be used to enrich the images in photo streams with semantic labels, such as titles, captions, or file names.

Generally, embodiments disclosed herein represent all images from the photo streams and the blog posts as a single graph. Each node in the graph corresponds to an image from a photo stream or a blog post. Embodiments disclosed herein leverage the graph to compute an "alignment" between the nodes, where the alignment is a sparse set of edges connecting the nodes representing images from photo streams and nodes representing images from blog posts. Embodiments disclosed herein further compute the summarization of a given photo stream by selecting the most representative set of nodes corresponding to images in a photo stream. Embodiments disclosed herein perform the alignment and summarization jointly, where the solution to one of the two concepts is alternatively computed in a given iteration, and the solution of one concept is conditioned on the solution of the other concept.

Figure 1:
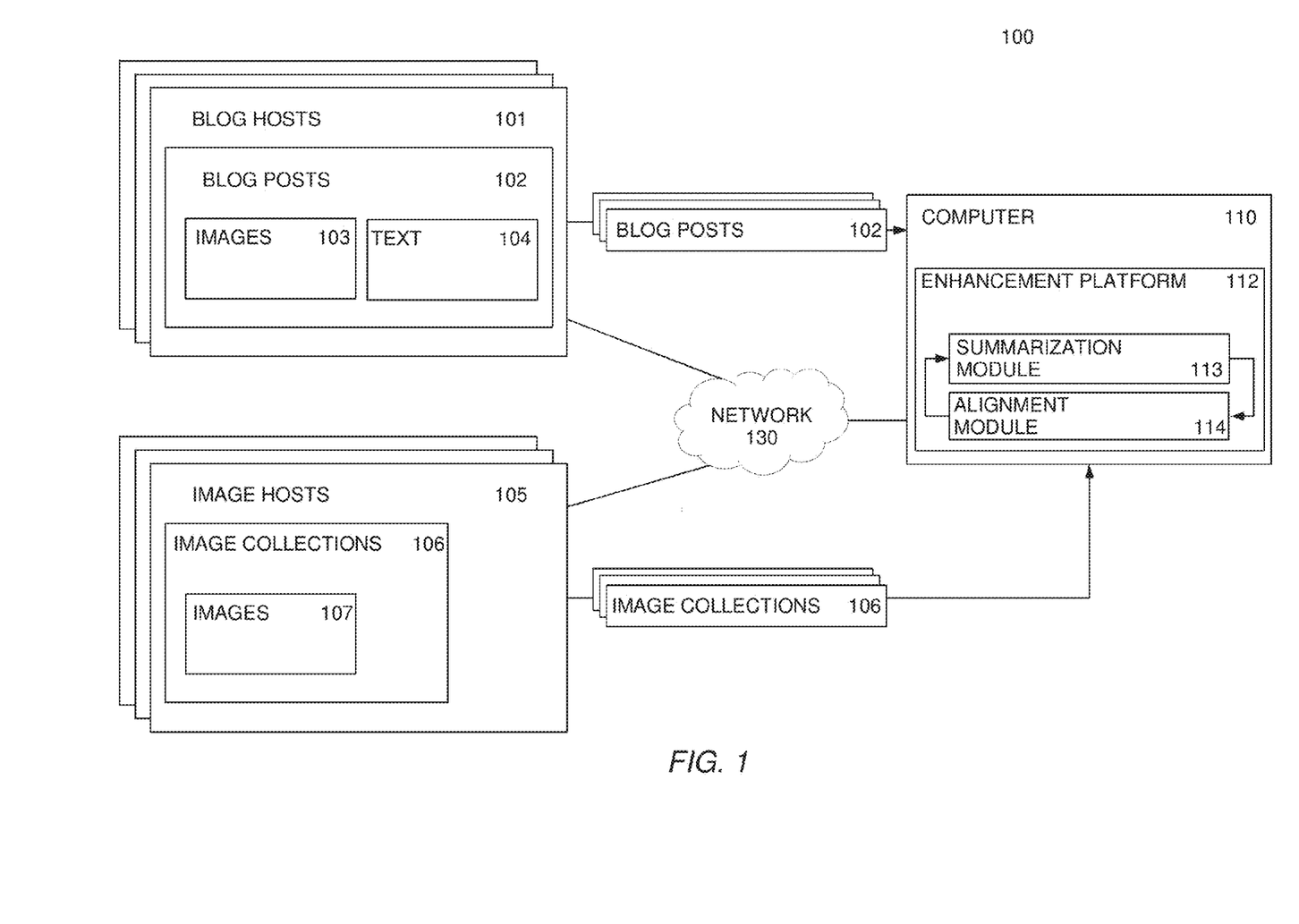
FIG. 1 illustrates an example of a computing environment that provides joint photo stream and blog post summarization and exploration, according to one embodiment.

FIG. 1 illustrates an example of a computing environment 100 that provides joint photo stream and blog post summarization and exploration, according to one embodiment. As shown, the computing environment 100 includes blog hosting services (blog hosts) 101, image hosting services (image hosts) 105, and a computer 110 that includes an enhancement platform 112 connected by a data communications network 130. The blog hosts 101 are computing platforms where users can create and publish blog posts 102 that include images 103 and text 104. For example, a user may create a travel blog post 102 related to their recent vacation to a theme park. The user may include a select number of images 103 that the user captured on the vacation to the theme park. In addition, the user may compose text 104 that is part of the blog post, which may include descriptions of the images 103. For example, the user may include an image of their family in front of a castle in the theme park, which may have a caption that describing the image (such as the people present in the image, the location the image was taken, and the like).

The image hosts 105 are online services that allow users to store images 107 as part of an image collection 106 (more generally referred to as "photo streams" or "image streams"). For example, a user may capture tens, hundreds, or thousands of images on a family vacation. The user may then create an image collection 106 for the family vacation which includes images 107 uploaded by the user.

Then enhancement platform 112 is configured to leverage information in the image collections 106 to enhance the blog posts 102, and leverage information in the blog posts 102 to enhance the images 107 in the image collections 106. In at least one embodiment, a user may identify blog posts 102 and image collections 106 that are related to a common topic, such as a city, theme park, and the like. As shown, the enhancement platform 112 includes a summarization module 113 and an alignment module 114. As shown, the enhancement platform 112 may receive blog posts 102 and image collections 106 as input. The summarization module 113 is configured to select the most interesting and important images 107 from an image collection 106, and return the selected images as a summary (or summarization) of the image collection 106. The alignment module 114 is configured to discover correspondences (or relationships) between images 103 in a blog post 102 and images 107 in an image collection 106. In at least one embodiment, and as described in greater detail below, the summarization module 113 computes the summary and the alignment module 114 determines the alignment using support vector machine (SVM) algorithms. However, other suitable algorithms may be used. As shown, the summarization module 113 and alignment module 114 are dependent on each other. The enhancement platform 112 alternates between one of the summarization module 113 and the alignment module 114. The output of a given iteration of one module is passed as input to the other module. When the outputs of each module 113, 114 converge, a final solution is reached.

Figure 2:
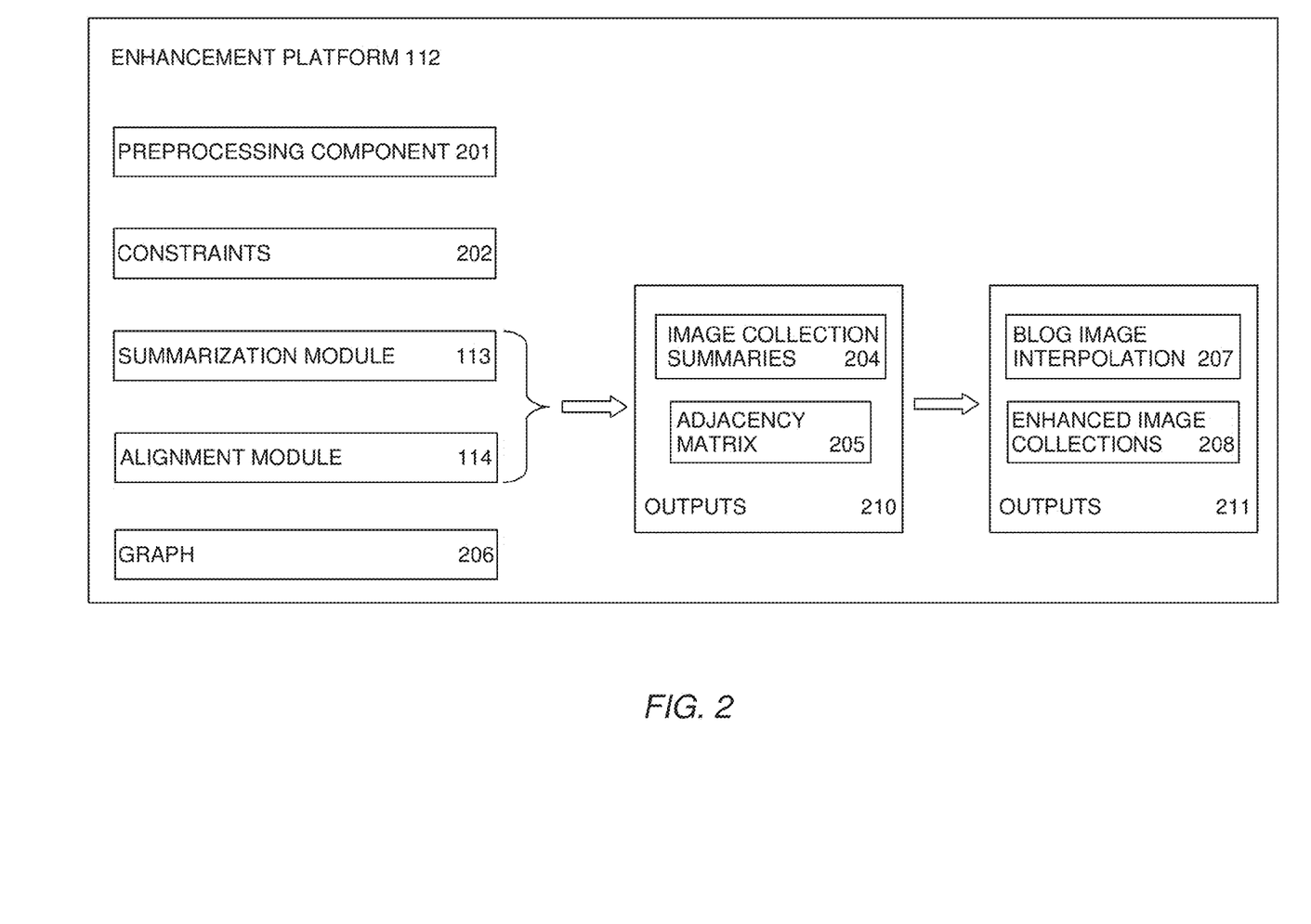
FIG. 2 further illustrates the enhancement platform first shown in FIG. 1, according to one embodiment.
Figure 3:
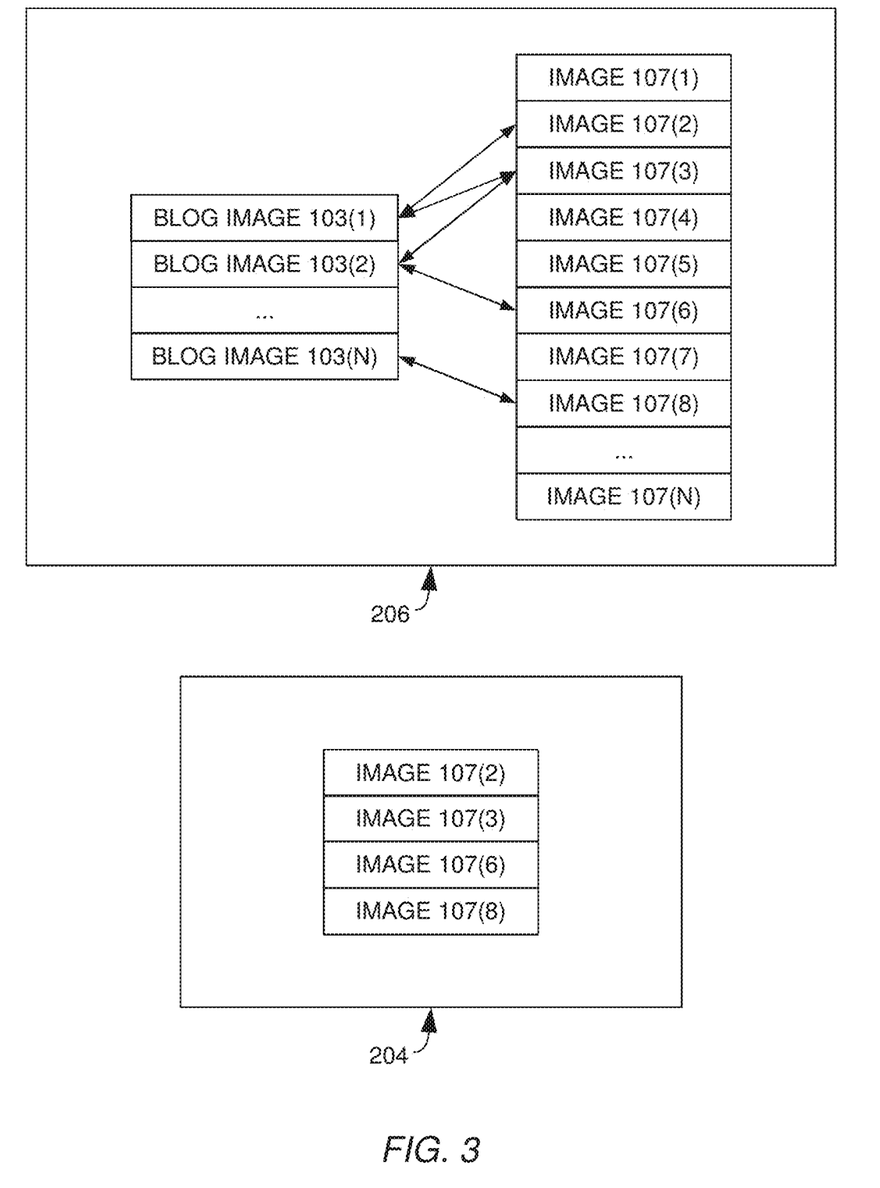
FIG. 3 illustrates an example of alignments between blogs and photo streams and an example of a photo stream summary, according to one embodiment.

FIG. 2 further illustrates the enhancement platform 112 first shown in FIG. 1, according to one embodiment. As shown, the enhancement platform 112 also includes a preprocessing component 201, a set of constraints 202, and a graph 206. The preprocessing component 201 is configured to extract features from images 103, 107, location information from blog posts 102, key phrases from the blog text 104, and compute a confidence for associations between segments of blog text 104 and blog images 103. The constraints 202 may be predefined and/or user-defined constraints that are applied by the summarization module 113 and/or the alignment module 114, described in greater detail below. The graph 206 may represent each image from both data sources (the blog posts 102 and image collections 106). More specifically, the nodes (or vertices) of the graph 206 correspond to an image from the blog images 103 (collectively referred to as I) and the images 107 from the image collections 106 (collectively referred to as P). The graph 206 may therefore be a bipartite image graph G=(V,E), where V=(I ∪ P), and the edge set E represents the correspondences between the vertices. An example graph 206 is depicted in FIG. 3. The edges E may be represented by an adjacency matrix 204, defined as $W \in R^{|I| \times |P|}$, where P is the number of all images 107 in all image collections 106. Therefore, the alignment module 114 may compute an adjacency matrix 204 defining the edges in the graph 206, while the summarization module 113 may determine the best subset of $S^l \subset P^l$ for each photo stream $P^l \in P$, where S is a set of summaries denoted by $S=\{S^1, \ldots, S^L\}$.

Returning to the constraints 202, an example constraint for the summarization module 113 may include a first constraint that requires selection of blog images that are highly representative and selective. Therefore the first constraint may specify that images 107 selected as part of the summary $S^l$ of the image collection 106 should have as many alignment in-links from blog images 103. Mathematically, the constraint may be defined as $W_{S^l} \in R^{|I| \times |S^l|}$, where a part of the adjacency matrix from all blog images to the summary $S^l$ is non-sparse. A second constraint for the summarization module may specify that the images of the summary $S^l$ should provide high coverage and diversity, such that the summary $S^l$ should contain as few redundant images as possible, and should not miss any important details in the image collections 106. A first example constraint 202 for the alignment module 114 may be that the adjacency matrix 204 is sparse (i.e., W has few non-zero elements). This first constraint 202 allows the enhancement platform 112 to retain only a small number of strong correspondences between blog images 103 and images 107 from image collections 106. A second constraint 202 for the alignment module 114 may specify that blog images 103 should be aligned with images that are in a summary, namely $S^l \in S$, since each image collection 106 is likely to include redundant and noisy images 107. A third constraint 202 for the alignment module 114 may be that consecutive images 103 in a blog post 102 should match images in the same image collection 106 for continuity.

As shown, the summarization module 113 and alignment module 114 produce the outputs 210, which includes the image collection summaries 204 and the adjacency matrix 205. Although shown as being a joint output 210, the summarization module 113 produces the image collection summaries 204, and the alignment module 114 produces the adjacency matrix 205. However, as described in FIG. 1, the summarization module 113 and alignment module 114 are conditioned on each other, where, for example, the summarization module 113 executes an algorithm in a given iteration, the output of which is provided to the alignment module 114 as input for an iteration, and so on. The image collection summaries 204 include a subset of images 107 from the image collections 106 that are the best suited to serve as representative images in a summary of one or more image collections 106 (referred to as $S^l \subset P^l$ for each photo stream $P^l \in P$). In one embodiment, the summarization module 113 may define a ranking vector $s^l$ that assigns a ranking score to all possible subsets of a given photo stream $P^l$. In one embodiment, the objective of the summarization module 113 may be defined as finding $S^{l*}=\mathrm{argmax}_{s \subset s^l} s_s^l$. In at least one embodiment, the summarization module 113 may apply a similar latent ranking SVM to satisfy the constraints 202 and compute the score $s^l$ for each subset of images using the following summarization equation:

$$\min_{W^n, \xi} \frac{1}{2}\|s^l\| + \frac{\lambda_s}{M} \sum_{i=1}^{M} \xi_i,$$

such that $\forall (S_i^l, S_j^l) \in C_p$: $s_i^l - s_j^l \geq \Delta_s(S_i^l, S_j^l) - \xi_i$, where $\lambda_s$ is a regularization parameter and $M=|C_p|$. In at least one embodiment, the loss function may be defined as $\Delta_s(S_i^l, S_j^l)=|k(S_i^l, P^l) - k(S_j^l, P^l)|$ for a summary pair $(S_i^l, S_j^l)$ where $k(S_i^l, P^l)=\Sigma_{p \in P^l} \max q_s \sigma(p,s) - \alpha|S_i^l| + \beta v(S_i^l)$.

The term $k(S_i^l, P^j)$ may be a weighted K-means objective to boost the coverage of images selected for inclusion in the image collection summaries 204. The weight $q_s$ may encourage that the summary 204 include images with high in-links. In at least one embodiment, the summarization module 113 may compute the weight vector $q \in R^{|P^j| \times 1}$ by building a row-normalized similarity graph S between the images within $P^j$, in which consecutive frames are connected as a $k^{th}$ order Markov chain (in one embodiment, k=5), and the weights may be computed based on similarity of features of the images. The summarization module 113 may then generate an integrated similarity matrix $[0 \ W_{P^j}; W_{P^j}^T \ S]$ where $W_{P^j} \in R^{|I| \times |P^j|}$ represents the similarity votes from all blog images 103 to a photo stream 106 represented by $P^j$. The summarization module 113 may then compute a PageRank vector, which becomes the weight q. As shown, the weight vector penalizes a summary that has too many images, and considers the variance of a summary, to encourage diversity in a summary $S_i$. The parameters α and β may be tuned via cross validation. Since the possible number of summaries $S^l$ (or subset of images 107 in the image collections 106) may be exponential, the summarization module 113 may limit the generation of constraints by using a greedy algorithm. The greedy algorithm be based on the underlying idea that constraint generation for enumerating all possible subsets is a special case of the budgeted max coverage problem, the $$\left(1 - \frac{1}{e}\right)$$

approximation bound still holds.

As previously stated, the alignment module 114 may compute the adjacency matrix 205. In computing the adjacency matrix 205, therefore, the alignment module 114 determines correspondences or relationships between blog images and photo streams. For example, the alignment module 114 may define a relationship between a blog image 103 and an image 107 that each includes a depiction of a castle in a theme park. In at least one embodiment, the alignment module 114 initially operates on an initial set $S^{(0)}$ of image collection summaries 204. In at least one embodiment, the enhancement platform 112 and/or the summarization module 113 may compute $S^{(0)}$ by applying K-means clustering on the image descriptors of each image collection 106. The K may be set such that $K=0.3|P^j|$, where $|P^j|$ is the size of the image collection 106. By setting a relatively K value, a large number of images may be initially selected for inclusion in $S^{(0)}$. However, as iterations of the summarization module 113 proceed, $S^{(t)}$ is updated to include a diverse set of all important images while minimizing redundancy.

The alignment module 114 may optimize the alignment (e.g., the adjacency matrix 105) using a latent ranking SVM that minimizes a regularized margin-based pairwise loss to satisfy the constraints 202. The alignment module 114 may apply the optimization process to the images 103 of each blog post 102 separately, where $W^n \in R^{|T^n| \times |P|}$ denotes a portion of the adjacency matrix 105 for blog $B^n$. In one embodiment, the alignment module 114 may apply the following alignment equation to optimize the adjacency matrix:

$$\min_{W^n, \xi} \frac{1}{2} \|W^n\|_1 + \frac{\lambda_A}{M} \sum_{i=1}^{M} \xi_i,$$

such that $\forall (i,j,k) \in C_d \cup C_s: W_{ij}^n - W_{ik}^n \geq \Delta(\sigma_{ij}, \sigma_{ik}) - \xi_i$, such that $\forall (i,j,k) \in C_c: W_{ij}^n - W_{ik}^n \geq \Delta(\#_{ij}, \#_{ik}) - \xi_i$, where $\lambda_A$ is a regularization parameter and $M=|C_d|+|C_s|+|C_c|$.

As shown, the alignment equation uses penalties to encourage sparsity of $W^n$ to satisfy the constraint 202 specifying that the adjacency matrix 205 should have few non-zero elements. The constraints 202 may include the three-constraint set C, which includes a large number of triplets of images (i,j,k), where i is sampled from blog $B^n$ and j,k are sampled from image collections 106. Generally, $C_d$ is a similarity constraint penalizing the violation that a blog image i is less similar to j than k when $W_{i,j}^n \geq W_{j,k}^n$. For a loss function, the alignment module 114 may use $\Delta(\sigma_{ij}, \sigma_{ik}) = |\sigma_{ij} - \sigma_{ik}|$ where $\sigma_{ij}$ is the image similarity between image i and image j (described in greater detail below). In the alignment equation, $C_s$ may be a second constraint 202 which prefers matching with images in the image collection summaries 204 computed by the summarization module 113. Thus, if $j \in S$ and $k \notin S$, then $W_{i,j}^n$ is likely to be higher than $W_{i,k}^n$. The third constraint $C_c$ is a continuity constraint, which encourages consecutive blog images 103 in a blog post 102 to be a match with images in the same image collection 106. Assuming $j \in P^l$ and $k \in p^m$, $$\#_{ij} = \sum_{p \in P^l} \frac{(\sigma_{i-1,p} + \sigma_{i+1,p})}{|P^l|},$$

which indicates the mean feature of similarity between image i's neighbors (i−1, i+1) in the image collection 106. By defining the loss function $\Delta(\#_{ij}, \#_{ik}) = |\#_{ij} - \#_{ik}|$, if image i's neighbors are more similar to $P^l$ than $p^m$, image i is more likely to match $j \in P^l$ than $k \in P^m$.

In one embodiment, to generate the set of constraints C, the alignment module 114 may find the K-nearest image collections 106 defined as $N(B^n)$ for each blog $B^n$, which in one embodiment is found by using the Hausdorff distance metric and generating constraint samples only from $N(B^n)$. In one embodiment $K=c \times \log|P|$, and $c=4$. The size of the set of constraints C may then be fixed (e.g., to 5,000-10,000 per blog image 103) according to the allowed computational resource. For each blog image 103, the alignment module may sample triplet constraints using a weighted random sampling without replacement. For example, $C_s$ for blog image i may be determined by choosing one image from $j \in S$ according to the weight of similarity $\sigma_{ij}$ and another image from $k \notin S$. The triplet (i,j,k) is accepted only if $\sigma_{ij} > \sigma_{ik}$, or image i is more similar to image j than image k. In at least one embodiment, the alignment equation is optimized using an online stochastic coordinate descent algorithm.

As shown in FIG. 2, the enhancement platform 112 may leverage the image collection summaries 204 and the adjacency matrix 205 to compute a second set of outputs 211, which include a blog image interpolation 207 and enhanced image collections 208. The blog image interpolation 207 includes a set of images from the image collections 106 that may be presented as temporally occurring "in between" two blog images 103. The enhanced image collection 208 may include a set of images 107 from the image collections 106 that have been modified to include descriptive metadata extracted from the blog text 104.

To determine the blog image interpolation 207, the enhancement platform 112 may attempt interpolation for each pair of consecutive blog images 103 from each of the blogs 102. The enhancement platform 112 may initially represent each image collection 106 as a first-order Markov chain (i.e., a sequence of images) using feature similarity as edge weight, thus obtaining a symmetric adjacency matrix $S^I$ for each photo stream $P^I$. The enhancement platform 112 may then build a block-diagonal matrix $S \in R^{|S| \times |S|}$ by combining all image collection summaries 204 ($S^i$) for each image collection 106. The enhancement platform 112 may then compute an integrated similarity matrix $V=[0\ W;\ W^T\ S]$. Given a pair of blog images 103 denoted as ($I_i^n$, $I_j^n$), the enhancement platform 112 may apply Yen's algorithm to the integrated similarity matrix V to generate K shortest paths between ($I_i^n$, $I_j^n$). The enhancement platform 112 may then select only those images that are in one of the image collection summaries 204 (S).

To enhance the images 107 of the image collections 106, the enhancement platform 112 may extract semantic knowledge from the blog posts 102 via the preprocessing component 201, described in greater detail below. Generally, the preprocessing component 201 extracts location information and key phrases from the blog text 104, and uses the extracted information to enrich the images 107 with metadata.

FIG. 3 illustrates an example of alignments between blogs and photo streams and an example of a photo stream summary, according to one embodiment. More specifically, FIG. 3 includes a graph 206 that depicts associations between a set of blog images 103(1–N) and images 107(1–N) from image collections 106. As shown, each image 103, 107 is a node in the graph 206. After processing, the alignment component 114 may compute an adjacency matrix 205 that defines associations, or relationships, between the blog images 103 and image collection images 107. As shown, blog image 103(1) is associated with image 107(2) and image 107(3), while blog image 103(2) is associated with image 107(3) and image 107(6), and blog image 103(N) is associated with image 107(8).

FIG. 3 also depicts an example image collection summary 204, which includes the most representative images from the images 107(1–N). As shown, the summarization component 113 has selected images 107(2), 107(3), 107(6), and 107(8). The selected images comply with the constraint that the summary 204 include the images 207 with the most in-links from the blog images 103.

Figure 4A:
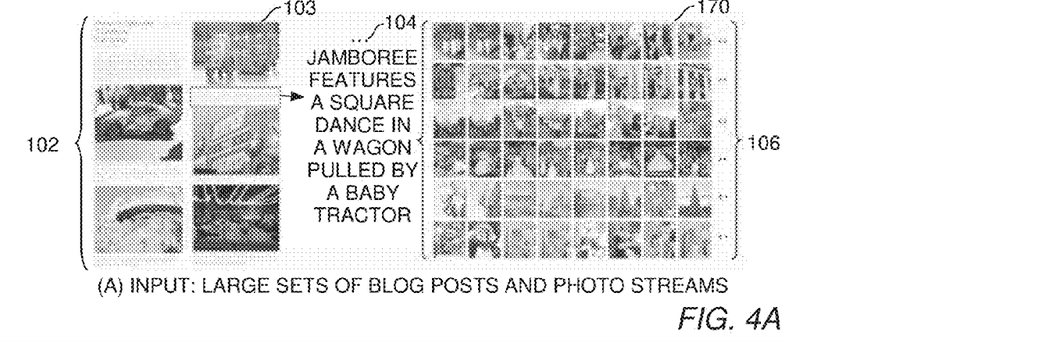
FIGS. 4A-4C illustrate examples of joint photo stream and blog post summarization and exploration, according to various embodiments.
Figure 4B:
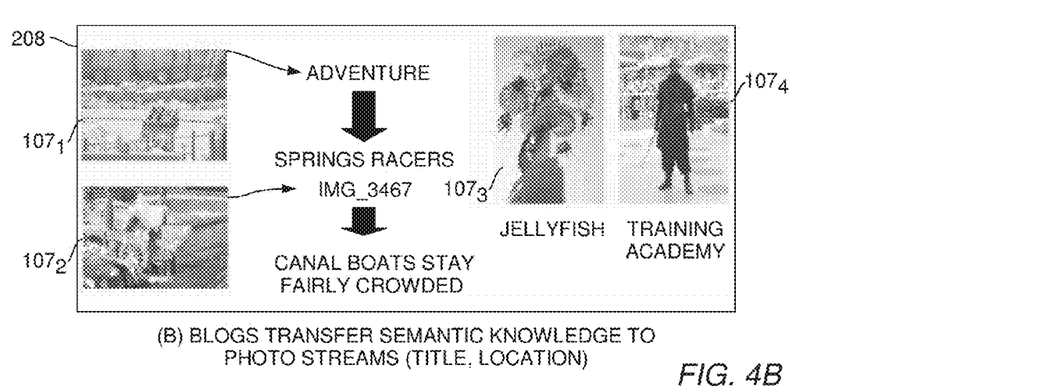
Figure 4C:
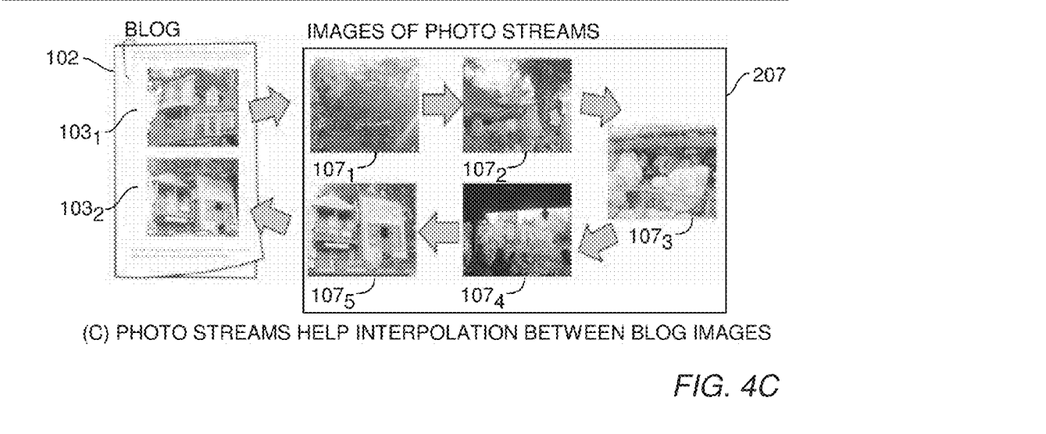

FIGS. 4A-4C illustrates an example of photo stream and blog post summarization and exploration, according to one embodiment. As previously discussed, the enhancement platform 112 takes, as input, blog posts and image collections. FIG. 4A shows an example blog post 102 that includes a set of images 103 and text 104. Similarly, FIG. 4A depicts an example image collection 106 that includes a plurality of images 107. As described above, the enhancement platform 112 may leverage the computed graph 206 and adjacency matrix 205 to enrich the images 107 with semantic knowledge extracted from the blog.

FIG. 4B depicts an example enhanced image collection 208 that includes images 107 that have been enriched with information from the text 104 of the blog post 102. For example, the generic title of "California Adventure" that may have been applied to all images in the collection 106, has been changed to "Radiator Springs Racers" for image $107_1$, as this is the particular ride depicted in the image $107_1$. The enhancement platform 112 may have identified the new title "Radiator Springs Racers" from the text 104 and/or GPS coordinates of a blog image 103 that is associated with the image $107_1$ in the adjacency matrix 205. Similarly, the enhancement platform 112 has updated a caption of image $107_2$ from "img_3467" to "Storybook land canal boats stay fairly crowded." As with the previous example, the enhancement platform may analyze the blog text 104 to extract the updated metadata, and add the metadata to the image $107_2$. Furthermore, as shown, images $107_3$ and $107_4$ have been updated to include enhanced captions/titles/filenames.

FIG. 4C depicts an example blog 102 includes two example blog images $103_1$ and $103_2$. FIG. 4C further depicts an example blog image interpolation 207 that includes example images $107_{1-5}$ from the image collection 106. As shown, the images $107_{1-5}$ are used to describe an example timeline of events that occurred between the blog images $103_1$ and $103_2$. Doing so provides additional information to readers of the blog 102 by "filling in the gaps" between the limited number of images typically presented in blogs.

Figure 5:
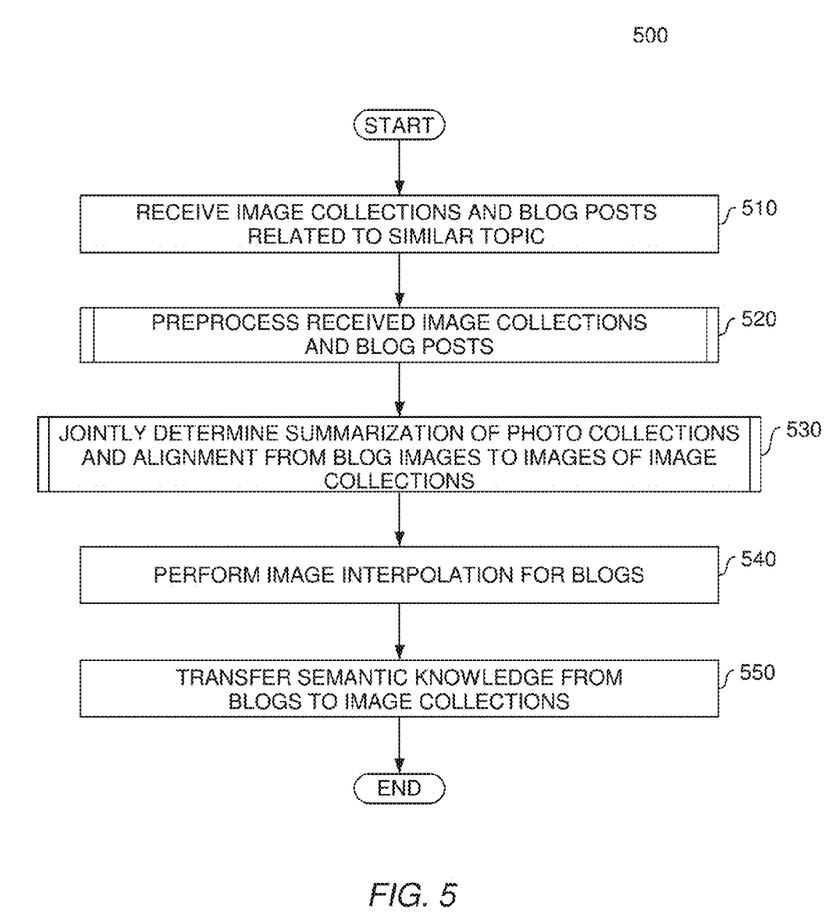
FIG. 5 illustrates a method for joint photo stream and blog post summarization and exploration, according to one embodiment.

FIG. 5 illustrates a method 500 for joint photo stream and blog post summarization and exploration, according to one embodiment. In at least one embodiment, the enhancement application 112 (or one or more components thereof) perform the steps of the method 500. As shown, the method begins at step 510, where the enhancement application 112 receives image collections 106 and blog posts 102 related to a similar topic. In one embodiment, a user may manually identify which image collections 106 and blog posts 102 are related to a similar topic, and provide the same to the enhancement application 112. At step 520, the preprocessing component 201 of the enhancement application 112 may preprocess the image collections 106 and blog posts 102. The preprocessing step is described in greater detail with reference to FIG. 6. At step 530, described in greater detail with reference to FIG. 7, the enhancement application 112 may jointly determine the subset of summarization images 204 from the image collection 106 and compute an alignment from blog images 103 to the images 107 of the image collection 106. In determining the summarization 204, the enhancement application 112 determines those images that are most representative of the entire image collection 106, and may return the summarization 204 to a user, or store the summarization 204 for future use. In computing the alignment, the enhancement application 112 determines the adjacency matrix 205 that represents associations between blog images 102 and images 107 from the image collection 106. As previously indicated, the enhancement application 112 generates a graph 206 to facilitate the summarization and alignment processes.

At step 540, the enhancement application 112 may perform image interpolation for blog posts 102 to create a set of interpolated images 207 that enhance the blog images 103. As previously indicated, the interpolated images 207 include images 107 from the image collections 106 that may have occurred in between blog images 103 in a blog post 102, providing further insight and detail to the blog post 102. At step 550, the enhancement application 112 may transfer semantic knowledge from blog posts 102 to images 107 of the image collections 106. For example, the enhancement application 112 may update metadata for images 107 to reflect more accurate captions, titles, filenames, locations the images were taken, and the like. The enhancement application 112 may update the metadata based on extracted attributes of blog images 103 and/or extracted information from blog text 104. Although depicted, a sequential relationship may not exist between step 540 and step 550. In at least one embodiment, steps 540 and 550 are alternative outputs based on the result of step 530. Therefore, in such embodiments, step 550 does not depend on the output of step 540, but rather on the output of step 530.

Figure 6:
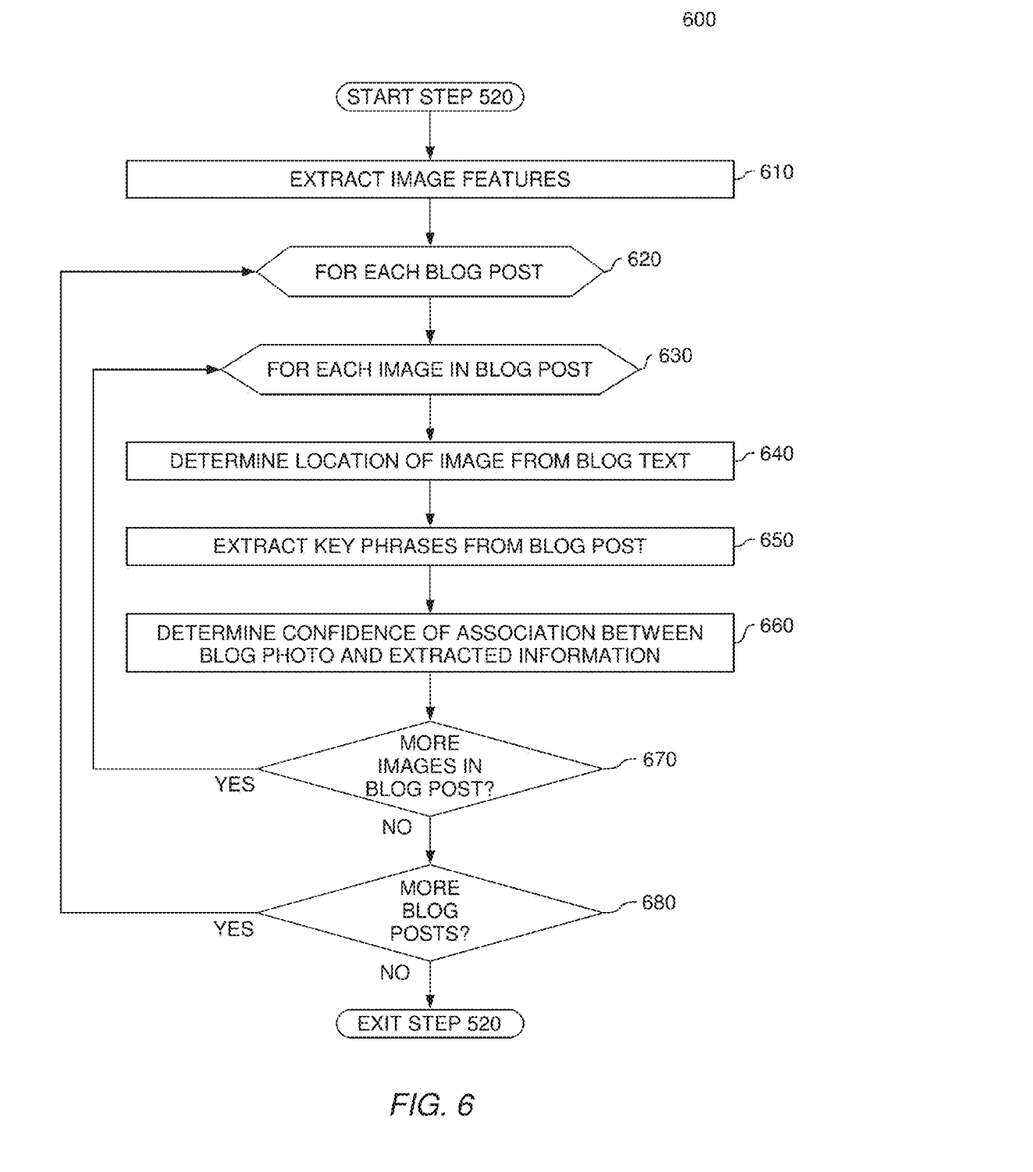
FIG. 6 illustrates a method for preprocessing image streams and blog posts, according to one embodiment.

FIG. 6 illustrates a method 600 corresponding to step 520 for preprocessing image streams and blog posts, according to one embodiment. In at least one embodiment, the preprocessing component 201 of the enhancement application 112 performs the steps of the method 600. In at least one embodiment, the input to the preprocessing component is a set of image collections 106 represented by P={P$^1$, ..., P$^L$} and a set of blog posts 103 represented by B={B$^1$, ..., B$^L$}. Each image collection 106 may include a set of images 107 taken in sequence in a single day, denoted by P={p$_1^l$, p$_1^l$}, and each image 107 may be associated with an owner ID u$_1^l$, timestamp t$_1^l$, GPS information g$_1^l$, and text information s$_1^l$ (such as titles, tags, etc.). In at least one embodiment, the preprocessing component 201 and/or the enhancement platform 112 may temporally store each image based on the timestamps of each image. The preprocessing component 201 may consider each blog post as a sequence of pairs of images 103 and text 104, denoted by B$^n$={(I$_1^n$,T$_1^n$) ..., (I$_N^n$n,T$_N^n$n)}, where I denotes all blog images 103.

As shown, the method 600 begins at step 610, where the preprocessing component 201 may extract features from each image 107 and blog image 103. In at least one embodiment, the preprocessing component 201 applies dense feature extraction with vector quantification. More specifically, the preprocessing component 201 may densely extract hue-saturation-value (HSV) color scale-invariant feature transform (SIFT) values, and histogram of oriented edge (HOG) features on a regular grid for each image at steps of 4 and 8 pixels, respectively. The preprocessing component 201 may then form 300 visual words for each feature type by applying K-means to randomly selected descriptors. The preprocessing component 201 may then assign the nearest word to every node of the grid. As image and/or region descriptors, the preprocessing component 201 may build L$_1$ normalized spatial pyramid histograms to count the frequency of each visual word in an image in three levels of regular grids. The image description vector v may be defined by concatenating the two spatial pyramid histograms of color SIFT and HOG features.

At step 620, the preprocessing component 201 executes a loop including steps 630-680 for processing of each blog post 102. Generally, the preprocessing component may represent each blog post B$^n$ as a sequence of images, associated metadata, and corresponding confidences described as: {(I$_1^n$,m$_1^n$,v$_1^n$), ..., (I$_N^n$,m$_N^n$)}, where m$_i^n$={l'$_i^n$,k$_i^n$}, l'$_i^n$ is a list of locations, k$_i^n$ is a set of key phrases extracted from the parsed text that is associated with the image i in blog n, and v'$_i^n$ ∈ [0,1] is a vector of confidence scores of length |l'$_i^n$|+|k'$_i^n$|. At step 630, the preprocessing component 201 executes a loop including steps 640-670 for each image 103 in the blog post 102.

At step 640, the preprocessing component 201 may determine the location of the current image from the blog text 104. To determine the location information, the preprocessing component 201 may build a parse tree for noun phrase chunking, and classify each node using a linear chain CRF-based named entity recognizer (NER). The preprocessing component 201 may then select the location-related entities, and find the closest matches to venues of interest (such as the Statue of Liberty, city hall in a city, an attraction in a theme park, etc.). The confidence of a word tagged as a possible location of interest is the posterior class probability of the NER labeling penalized by its Levenstein distance to the closest match. In at least one embodiment, a standard NER training corpus is used to train an NER model. At step 650, the preprocessing component 201 may extract key phrases from the blog text 103. In at least one embodiment, the preprocessing component 201 may use an unsupervised statistical method to parse the text into a set of candidate keywords, and perform natural language processing pre-processing steps (such as removal of stop words, etc.). The preprocessing component 201 may then re-rank the candidates based on their word co-occurrence scores measured by term frequency and keyword adjacency. In at least one embodiment, steps 640 and 650 may be performed in the alternative, and in any arbitrary order. Therefore, in such embodiments, once step 630 is executed, step 640, step 650, and/or both of steps 640 and 650 may be performed in any order.

At step 660, the preprocessing component 201 determines a confidence between the extracted text information (such as location information, key phrases, etc.). The preprocessing component 201 may assume that text blocks that are closer to an image may have a higher chance of belonging to (or being associated with) an image, and employ a heuristic based the image-to-text distance. For example, the preprocessing component 201 may compute a confidence score of an image belonging to a certain location as the summation of the confidence score of each block of text containing the name of that location, penalized by the distance of the image to that text block. The summation may be determined by the following equation:

$$v'^n_i = \Sigma_{t \in T}\{h_t(l'^n_i) - \text{pen}(d(t, I'^n_i))\}$$

Where v'$_i^n$ is the confidence score vector of an image I'$_i^n$ being associated with locations l'$_i^n$, T is a set of text blocks in the blog, h$_t$(l'$_i^n$) is a confidence score of a text block t ∈ T containing the locations l'$_i^n$, d(t, l'$_i^n$) is the index distance between the text block t and the image I'$_i^n$, and pen(·) is a penalty function that degrades the association between a text block and an image based on their distance.

At step 670, the preprocessing component 201 determines whether more images remain for preprocessing in the current blog post. If more images remain, the preprocessing component 201 returns to step 630. Otherwise, the preprocessing component 201 proceeds to step 680, where the preprocessing component 201 determines whether more blog posts remain for preprocessing. If more blog posts remain for preprocessing, the preprocessing component 201 returns to step 620. Otherwise, the method 600 ends.

Figure 7:
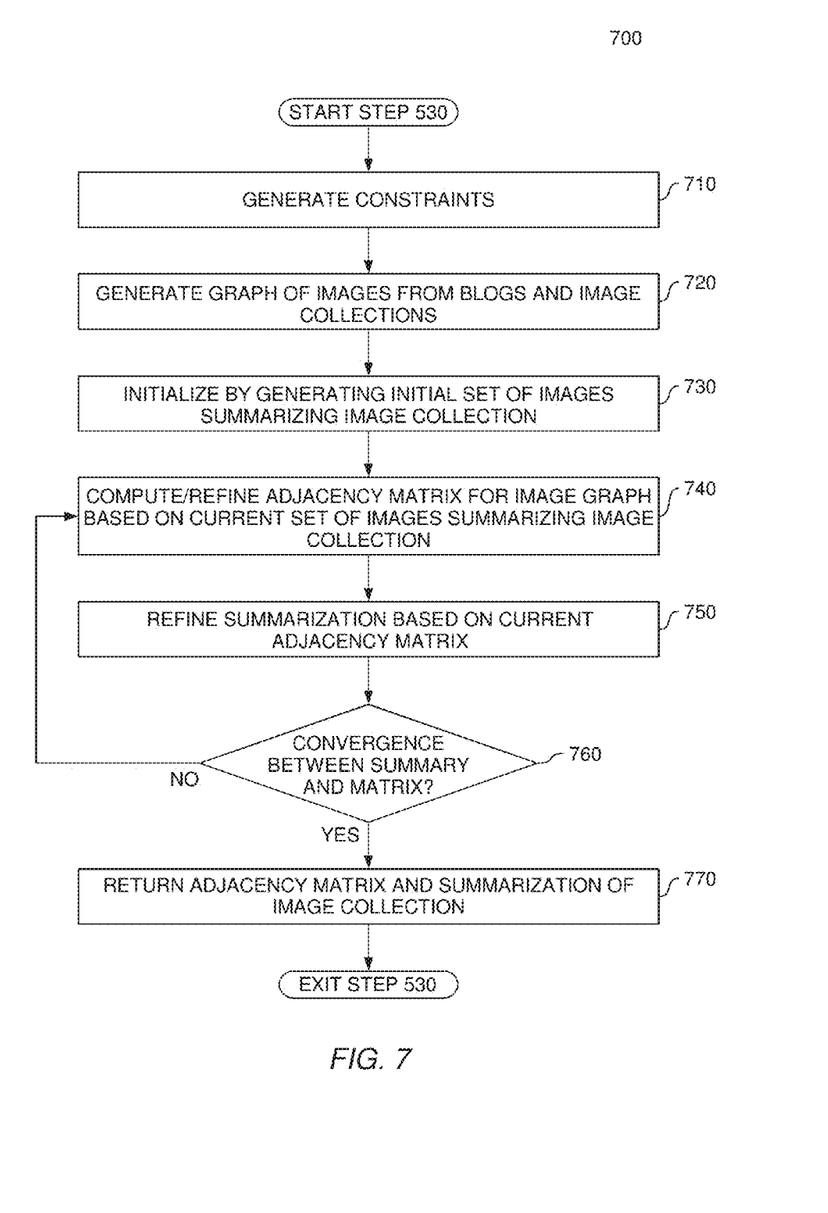
FIG. 7 illustrates a method to jointly determine a summarization of photo streams and an alignment from blog images to images of photo streams, according to one embodiment.

FIG. 7 illustrates a method 700 corresponding to step 530 to jointly determine a summarization of photo streams and an alignment from blog images to images of photo streams, according to one embodiment. At step 710, a user may define constraints for the SVM algorithms applied by the summarization module 113 and alignment module 114. At step 720, the enhancement application 112 may generate the graph 206 of blog images 102 and images 107 from the image collections 106. At step 730, the enhancement application 112 may initialize the joint summarization/alignment process by generating an initial set of images 208 that summarize the image collection 106. The initial set of images 208 may then be provided as input to the alignment module 114. In another embodiment, the enhancement application 112 may initialize the process by generating an initial adjacency matrix 205 (which would then be used as input into the summarization module 113). At step 740, the alignment module 114 may compute (or refine) the adjacency matrix based on the current set of images 208 summarizing the image collection 106. At step 750, the summarization module 113 may refine the summarization images 208 using the current adjacency matrix 205 as input. At step 760, the enhancement application 112 determines whether the summary 208 and the adjacency matrix 205 have converged. Generally, the summary 208 and the adjacency matrix 205 match closely at convergence. If the summary 208 and adjacency matrix 205 have not converged, the method returns to step 740 for an additional iteration of the alignment module 114 and the summarization module 113. Otherwise, the method proceeds to step 770, where the final adjacency matrix 205 and the summarization 208 of the image collection are returned.

Figure 8:
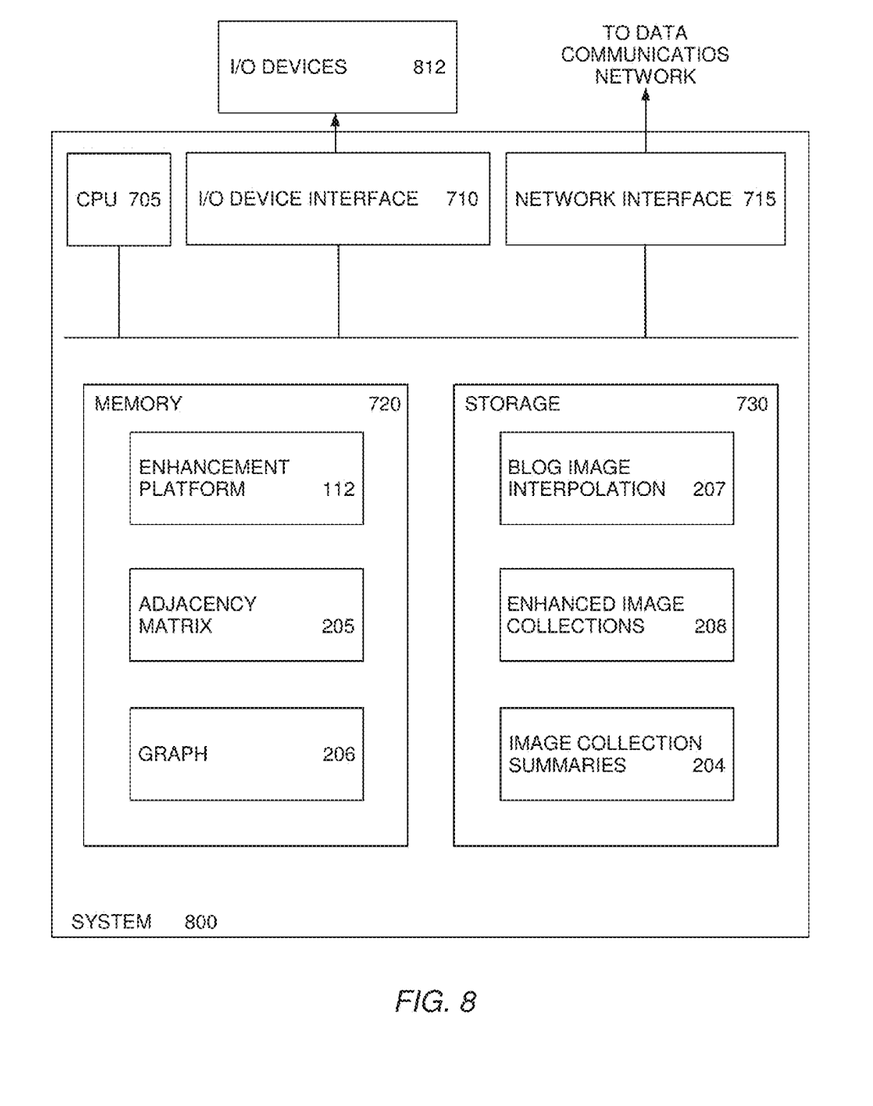
FIG. 8, illustrates an example computing system configured to perform joint photo stream and blog post summarization and exploration, according to one embodiment.

FIG. 8, illustrates an example computing system 800 configured to perform joint photo stream and blog post summarization and exploration, according to one embodiment. As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the computing elements shown in computing system 800 may correspond to a physical computing system (e.g., a system in a data center) or may be a virtual computing instance executing within a computing cloud.

The CPU 805 retrieves programming instructions and application data stored in the memory 820 and storage 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes the enhancement platform 112, the adjacency matrix 205, and the graph 206, each described in greater detail above. Illustratively the storage 730 includes the image collection summaries 207, the blog image interpolation 207, and the enhanced image collection 208, described in greater detail above. Generally, the computing system 800 implements all techniques, methods, and functions described in FIGS. 1-7.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the enhancement platform 112 could execute on a computing system in the cloud and perform alignment and summarization of large groups of images from blog posts and image collections. In such a case, the enhancement platform 112 could generate the image collection summaries 204, blog image interpolations 207, and enhanced image collections 208 for storage at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   assigning each of a plurality of images in a blog post and each of a plurality of images in a collection of images to a respective node in a graph; computing an adjacency matrix for the graph, wherein the adjacency matrix defines relationships between images in the blog post and images in the collections of images; and determining a first subset of the images in the collection of images that summarize the images in the image collection, wherein the first subset is determined based on the adjacency matrix and the adjacency matrix is computed based on the first subset of the images in the collection of images.

2. The method of claim 1, further comprising:
   determining a location where a first image in the blog post was taken based on a text of the blog post associated with the first image in the blog post, wherein the adjacency matrix associates the first image of the blog post with a first image in the collection of images; and
   assigning the location of the first image in the blog post as a location of the first image.

3. The method of claim 2, further comprising:
   extracting a first phrase from the text of the blog post associated with the first image in the blog post; and
   assigning the first phrase as a title of the first image.

4. The method of claim 1, further comprising:
   determining a second subset of images in the collection of images based on the adjacency matrix and the first subset of images; and
   returning the second subset of images as an interpolation between a first image in the blog post and a second image in the blog post.

5. The method of claim 4, wherein the collection of images comprises a plurality of collections of images from different users, wherein the second subset of images is from a first collection of images of the plurality of collections of images.

6. The method of claim 1, wherein the adjacency matrix and the first subset are based on an initial set of images of the collection of images, wherein the initial set is determined by applying K-means clustering on a set of image descriptors of the collection of images, wherein the initial set of images in the collection of images is provided as input to a first support vector machine (SVM) configured to compute the adjacency matrix.

7. The method of claim 6, wherein the first SVM is configured to compute a first adjacency matrix based on the initial set of images in the collection of images, wherein a second SVM is configured to determine the first set of images in the collection of images based on the first adjacency matrix, wherein the first SVM is configured to operate on the output of the second SVM, wherein the second SVM is configured to operate on the output of the first SVM, wherein the first and second SVMs iteratively execute until the adjacency matrix and the first subset of images in the collection of images converge.

8. The method of claim 1, wherein the first subset of images in the collection of images is further determined based at least in part on a number of relationships between the plurality of images in the blog post and each image in the collection of images.

9. A computer program product, comprising: a non-transitory computer-readable storage medium having computer-readable program code embodied therewith, the computer-readable program code executable by a processor to perform an operation comprising: assigning each of a plurality of images in a blog post and each of a plurality of images in a collection of images to a respective node in a graph; computing an adjacency matrix for the graph, wherein the adjacency matrix defines relationships between images in the blog post and images in the collections of images; and determining a first subset of the images in the collection of images that summarize the images in the image collection, wherein the first subset is determined based on the adjacency matrix, wherein the adjacency matrix is computed based on the first subset of the images in the collection of images.

10. The computer program product of claim 9, the operation further comprising:
determining a location where a first image in the blog post was taken based on a text of the blog post associated with the first image in the blog post, wherein the adjacency matrix associates the first image of the blog post with a first image in the collection of images; and
assigning the location of the first image in the blog post as a location of the first image.

11. The computer program product of claim 10, the operation further comprising:
extracting a first phrase from the text of the blog post associated with the first image in the blog post; and
assigning the first phrase as a title of the first image.

12. The computer program product of claim 9, the operation further comprising:
determining a second subset of images in the collection of images based on the adjacency matrix and the first subset of images; and
returning the second subset of images as an interpolation between a first image in the blog post and a second image in the blog post.

13. The computer program product of claim 12, wherein the collection of images comprises a plurality of collections of images from different users, wherein the second subset of images is from a first collection of images of the plurality of collections of images.

14. The computer program product of claim 9, wherein the adjacency matrix and the first subset are based on an initial set of images of the collection of images, wherein the initial set is determined by applying K-means clustering on a set of image descriptors of the collection of images, wherein the initial set of images in the collection of images is provided as input to a first support vector machine (SVM) configured to compute the adjacency matrix.

15. The computer program product of claim 14, wherein the first SVM is configured to compute a first adjacency matrix based on the initial set of images in the collection of images, wherein a second SVM is configured to determine the first set of images in the collection of images based on the first adjacency matrix, wherein the first SVM is configured to operate on the output of the second SVM, wherein the second SVM is configured to operate on the output of the first SVM, wherein the first and second SVMs iteratively execute until the adjacency matrix and the first subset of images in the collection of images converge.

16. The computer program product of claim 9, wherein the first subset of images in the collection of images is further determined based at least in part on a number of relationships between the plurality of images in the blog post and each image in the collection of images.

17. A system, comprising: a computer processor; and a memory containing a program which when executed by the processor performs an operation comprising: assigning each of a plurality of images in a blog post and each of a plurality of images in a collection of images to a respective node in a graph; computing an adjacency matrix for the graph, wherein the adjacency matrix defines relationships between images in the blog post and images in the collections of images; and determining a first subset of the images in the collection of images that summarize the images in the image collection, wherein the first subset is determined based on the adjacency matrix, wherein the adjacency matrix is computed based on the first subset of the images in the collection of images.

18. The system of claim 17, the operation further comprising:
determining a location where a first image in the blog post was taken based on a text of the blog post associated with the first image in the blog post, wherein the adjacency matrix associates the first image of the blog post with a first image in the collection of images; and
assigning the location of the first image in the blog post as a location of the first image.

19. The system of claim 18, the operation further comprising:
extracting a first phrase from the text of the blog post associated with the first image in the blog post; and
assigning the first phrase as a title of the first image.

20. The system of claim 17, the operation further comprising:
determining a second subset of images in the collection of images based on the adjacency matrix and the first subset of images; and
returning the second subset of images as an interpolation between a first image in the blog post and a second image in the blog post.

21. The system of claim 20, wherein the collection of images comprises a plurality of collections of images from different users, wherein the second subset of images is from a first collection of images of the plurality of collections of images.

22. The system of claim 17, wherein the adjacency matrix and the first subset are based on an initial set of images of the collection of images, wherein the initial set is determined by applying K-means clustering on a set of image descriptors of the collection of images, wherein the initial set of images in the collection of images is provided as input to a first support vector machine (SVM) configured to compute the adjacency matrix.

23. The system of claim 22, wherein the first SVM is configured to compute a first adjacency matrix based on the initial set of images in the collection of images, wherein a second SVM is configured to determine the first set of images in the collection of images based on the first adjacency matrix, wherein the first SVM is configured to operate on the output of the second SVM, wherein the second SVM is configured to operate on the output of the first SVM, wherein the first and second SVMs iteratively execute until the adjacency matrix and the first subset of images in the collection of images converge.

\* \* \* \* \*

UNITED STATES PATENT AND TRADEMARK OFFICE
CERTIFICATE OF CORRECTION

PATENT NO. : 9,928,442 B2  
APPLICATION NO. : 15/076803  
DATED : March 27, 2018  
INVENTOR(S) : Leonid Sigal et al.

Page 1 of 1

It is certified that error appears in the above-identified patent and that said Letters Patent is hereby corrected as shown below:

On sheet 8 of 8, in Figure 8, Line 2, delete "COMMUNICATIOS" and insert -- COMMUNICATIONS --, therefor.

In Column 7, Line 8, delete "$(I_j^n, I_j^n)$," and insert -- $(I_i^n, I_j^n)$, --, therefor.

In Column 9, Line 42, delete "$(I_N^n, m_N^n)\}$," and insert -- $(I_N^n, m_N^n, v_N^n)\}$, --, therefor.

In Column 9, Line 60, delete "Levenstein" and insert -- Levenshtein --, therefor.

Signed and Sealed this  
Third Day of July, 2018

Andrei Iancu  
*Director of the United States Patent and Trademark Office*